(12) United States Patent
Wächtler et al.

(10) Patent No.: US 11,965,550 B2
(45) Date of Patent: Apr. 23, 2024

(54) ROLLING BEARING CAGE COMPRISING A CAGE LOCK, AND METHOD FOR MOUNTING SAID ROLLING BEARING CAGE

(71) Applicant: Schaeffler Technologies AG & Co. KG, Herzogenaurach (DE)

(72) Inventors: Stefan Wächtler, Herzogenaurach (DE); Robert Dressel, Gremsdorf (DE); Alfred Hock, Höchstadt / Aisch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/028,079

(22) PCT Filed: Sep. 9, 2021

(86) PCT No.: PCT/DE2021/100743
§ 371 (c)(1),
(2) Date: Mar. 23, 2023

(87) PCT Pub. No.: WO2022/083819
PCT Pub. Date: Apr. 28, 2022

(65) Prior Publication Data
US 2023/0332645 A1 Oct. 19, 2023

(30) Foreign Application Priority Data
Oct. 19, 2020 (DE) .................... 10 2020 127 445.9

(51) Int. Cl.
*F16C 33/38* (2006.01)
*F16C 33/46* (2006.01)
*F16C 43/04* (2006.01)

(52) U.S. Cl.
CPC ...... *F16C 33/3862* (2013.01); *F16C 33/4676* (2013.01); *F16C 33/4694* (2013.01); *F16C 43/04* (2013.01)

(58) Field of Classification Search
CPC .............. F16C 33/3862; F16C 33/4676; F16C 33/4694; F16C 43/04; F16C 33/585;
(Continued)

(56) References Cited

U.S. PATENT DOCUMENTS

| 4,961,651 A | * | 10/1990 | Rabe | ....................... F16C 33/50 384/577 |
| 9,145,917 B2 | * | 9/2015 | Ishibashi | ............. F16C 33/4694 |
| 2023/0296135 A1 | * | 9/2023 | Wächtler | ................. F16C 19/26 384/565 |

FOREIGN PATENT DOCUMENTS

| DE | 3041860 A1 | 6/1982 |
| DE | 3821037 A1 | 12/1989 |

(Continued)

*Primary Examiner* — Ryan J. Walters

(57) ABSTRACT

A rolling bearing cage includes axially spaced side rings, cage webs connecting the side rings, cage pockets, and first and second cage ends. The cage webs have rolling element guides projecting radially inwards and the cage pockets are formed between the rolling element guides. The first cage end has a closing element formed by an axial groove at a radial web surface of a cage web that is reinforced relative to the other cage webs and delimits a penultimate cage pocket. The second cage end has a closing element formed by a partial cage web connecting the end portions at the second cage end to one another. The partial cage web is arranged to hook into the axial groove to form a cage lock that secures the second cage end to the first cage end against unintentional loosening in a peripheral direction and in both radial directions.

15 Claims, 2 Drawing Sheets

(58) Field of Classification Search
CPC .. F16C 2226/76; F16C 19/26; F16C 33/4635; F16C 2361/61
See application file for complete search history.

(56) References Cited

FOREIGN PATENT DOCUMENTS

| | | |
|---|---|---|
| DE | 19513668 A1 | 10/1996 |
| DE | 102011007458 A1 | 10/2012 |
| DE | 102012021687 A1 | 5/2014 |
| DE | 102019106487 A1 | 9/2020 |
| JP | 10281165 A | 10/1998 |
| JP | 2014159836 A | 9/2014 |

\* cited by examiner

ROLLING BEARING CAGE COMPRISING A CAGE LOCK, AND METHOD FOR MOUNTING SAID ROLLING BEARING CAGE

CROSS-REFERENCE TO RELATED APPLICATIONS

This application is the United States National Phase of PCT Appln. No. PCT/DE2021/100743 filed Sep. 9, 2021, which claims priority to German Application No. DE102020127445.9 filed Oct. 19, 2020, the entire disclosures of which are incorporated by reference herein.

TECHNICAL FIELD

The present disclosure relates to a rolling bearing cage having a cage lock. The rolling bearing cage may be used for inner-ring-fastened roller sleeves for bearing hollow shafts, gear wheels or planet carriers in motor vehicle manual transmissions, for example. The present disclosure further relates to a method for mounting the rolling bearing cage.

BACKGROUND

In rolling bearing technology, roller sleeves are a radial roller bearing design with small radial overall height that enable space-saving and easy-to-assemble bearing arrangements with a high radial load-bearing capacity. A frequently used design is the housing- or outer-ring-fastened roller sleeve known from DE 195 13 668 A1, for example, which consists of an outer ring that can be inserted into a housing and a roller-and-cage assembly which is inserted into this outer ring and which is formed by an axially slotted bearing cage made of plastic without a cage lock and made of a plurality of roller-type rolling elements inserted into said bearing cage. The roller-type rolling elements roll on an outer raceway formed by the inner lateral surface of the outer ring. The roller-and-cage assembly is axially guided by means of two flanges which are provided on the axial sides of the outer ring and extend radially inwards.

An inverse design to this outer-ring-fastened roller sleeve is the shaft- or inner-ring-fastened roller sleeve known, for example, from documents DE 10 2011 007 458 A1 and DE 10 2012 021 687 A1, which, like an outer-ring-fastened roller sleeve, consists of an inner ring fastened on a shaft or axle and a roller-and-cage assembly which is disposed on said inner ring and which is formed by a bearing cage consisting of two side rings and a plurality of connecting webs as well as a plurality of roller-type rolling elements which are inserted into this bearing cage and which are retained by the bearing cage at regular spacings in the peripheral direction and roll on an inner raceway formed by the outer lateral surface of the inner ring. In this design too, the roller-and-cage assembly is guided axially by two flanges of the same length which are provided on the axial sides of the inner ring and which in this case extend radially outwards.

However, a disadvantage of this design of roller sleeve has been found to be that it is not possible to use a cost-effective, axially slotted bearing cage made of plastic without a cage lock, as is the case with outer-ring-fastened roller sleeves, since the ends of the bearing cage are not supported by the outer ring, as is the case with outer-ring-fastened roller sleeves. When assembling transmission parts mounted on inner-ring-fastened roller sleeves, it is therefore possible that the ends of a plastic bearing cage which rest loosely against one another fall out of the inner ring due to the force of gravity, causing problems during transmission assembly due to the cage ends blocking the installation space of the transmission parts.

A possible solution to this would be to use a closed bearing cage made of sheet steel, which is then inserted into the inner ring before the second flange is flanged and, after the second flange is flanged, is subjected to the necessary heat treatment together with the inner ring. For this, however, the increased manufacturing and material costs for the production of the inner-ring-fastened roller sleeve would have to be accepted.

Another possibility for solving the problem described would be to design the open plastic cage such that it can be closed with a cage lock, as is known, for example, from DE 38 21 037 A1. The rolling bearing cage disclosed in this publication consists of two side rings which have a common axis of rotation and the same basic dimensions and which are axially spaced apart from one another and a plurality of cage webs which connect the side rings to one another, which are designed with rolling element guides projecting inwards from the cage beyond the inner diameter of the side rings on both sides, between each of which cage pockets are formed for receiving rolling elements. In this case, the rolling bearing cage is axially divided at at least one peripheral location and as a result has at least a first and a second cage end, at each of which mutually corresponding closure elements are located and the side rings are designed with end portions reduced to half the radial height of the side rings and which are arranged radially one above the other when the rolling bearing cage is closed.

In practice, however, it has been shown that cage locks of this type are unsuitable for applications on plastic cages in inner-ring-fastened roller sleeves with large diameters and narrow widths due to the small cage width, or that this cage lock has not proved durable enough for the requirements present in a transmission.

SUMMARY

The present disclosure provides an axially divided rolling bearing cage, the cage lock of which is suitable for use on inner-ring-fastened roller sleeves with large diameters and narrow widths.

The disclosure provides a rolling bearing cage having a cage web between height-reduced end portions at a first cage end, and two sides which delimit a last and a penultimate cage pocket, respectively. The cage web has a cross-sectional profile which is reinforced in comparison with the other cage webs. A closure element at the first cage end is formed by an axial groove in the rolling element guide at the radial web surface of the cage web which delimits the penultimate cage pocket. The closure element at a second cage end is formed by a partial web which connects the height-reduced end portions at the second cage end to one another and has the same material thickness as the end portions. The closure element at the second cage end can be hooked into the axial groove in the rolling element guide of the cage web at the first cage end in such a way that the cage ends are secured in a peripheral direction and in both radial directions against unintentional loosening of the connection.

In the rolling bearing cage designed according to the disclosure, it is provided that the height-reduced end portions at the first cage end are formed on the side rings in extension of the outer peripheral surfaces of the side rings, and the height-reduced end portions at the second cage end are formed on the side rings in extension of the inner peripheral surfaces thereof. Since the end portions at both cage ends have a height reduced to half the radial height of the side rings, the rolling bearing cage has the same radial height at its separation point as the other portions of the side rings due to such a design in the mounted state, in which the end portions are arranged radially one above the other.

A further feature of the rolling bearing cage according to the disclosure is that the height reduction of the end portions is effected by straight steps in the side rings and that the end portions at the first cage end have a greater length than the length of the end portions at the second cage end. Instead of the transition from the radial height of the side rings to the radial height of the end portions via straight steps, it is alternatively also possible to design the transition with a concave profile, in which the correspondingly convex end faces of the end portions then engage. The longer design of the end portions at the first cage end has proven to be expedient for the mounting of the rolling bearing cage, since a detrimental collision of the partial web at the second cage end with the steps of the end portions at the first cage end can thus be avoided.

Both the rolling element guide of the cage web at the first cage end and all other rolling element guides on the cage webs may be designed to be axially shorter than the cage web itself and may be arranged axially centrally on the cage webs. This design has also proven useful for mounting the rolling bearing cage, as it makes it possible to arrange the end portions at the first cage end axially adjacent to the end portions at the second cage end.

The axial groove in the rolling element guide of the cage web at the first cage end may have the same profile cross-section as the partial web connecting the end portions to one another at the second cage end, and, in the mounted state of the rolling bearing cage, the axial groove may be filled by the partial web. Here, the rolling element guide has no shoulders or edges that hinder rolling element contact and the flow of lubricant in the cage pocket.

Securing of the cage ends against unintentional loosening of the connection in the other peripheral direction may be effected by filling a rolling element into the penultimate cage pocket of the rolling bearing cage completed after the connection of the cage ends to the partial web. In concrete terms, this means that the cage ends are secured against unintentional loosening in the counterclockwise direction by the partial web at the second cage end fixed in the axial groove in the rolling element guide of the cage web formed with a reinforced cross-sectional profile at the first cage end while the cage ends are secured against unintentional loosening in the clockwise direction by a rolling element inserted into the penultimate cage pocket at the first cage end, which rolling element rests with its lateral surface against the rolling element guide completed with the partial web of the second cage end.

Securing of the cage ends against displacement in both axial directions and the centering of the cage ends relative to one another may be effected by filling a rolling element into the last cage pocket of the rolling bearing cage completed after the connection of the cage ends. In the case of an inner-ring-fastened roller sleeve, this means that after insertion of the cylindrical roller into the last cage pocket at the second cage end, the end faces represent stops on both sides by means of which the first cage end is prevented from axial movement in both directions.

Furthermore, the present disclosure also includes a method for mounting said rolling bearing cage, the method comprising the following steps:

a) Widening of the cage ends of the axially divided rolling bearing cage to such an extent that it can be pushed into a roller sleeve via a radial flange of the inner ring of the sleeve;
b) Tangential displacement of the cage ends relative to one another in such a way that the cage web at the first cage end is lifted over the partial web at the second cage end into the last cage pocket and the end portions at the first cage end are arranged axially adjacent to the end portions at the second cage end;
c) Tangential displacement of the cage ends backwards against one another until the partial web at the second cage end displaces into the axial groove in the rolling element guide of the cage web at the first cage end and fills the axial groove;
d) Axial displacement of the cage ends until the end portions at the first cage end are arranged radially above the end portions at the second cage end and the end faces of the end portions of the first cage end rest against the steps in the side rings of the second cage end;
e) Securing the connection against unintentional loosening in the peripheral direction by inserting the rolling elements of the roller sleeve into the pockets of the rolling bearing cage.

The disclosed rolling bearing cage comprising a cage lock thus provides the advantage over the axially divided rolling bearing cages known from the prior art that its cage lock is suitable for use on inner-ring-fastened roller sleeves with large diameters and narrow widths by the use of a partial web hooked into an axial groove in a cage web at the first cage end as a closure element.

BRIEF DESCRIPTION OF THE DRAWINGS

An example embodiment of the rolling bearing cage designed according to the disclosure is explained in more detail below with reference to the accompanying drawings. In the drawings.

DETAILED DESCRIPTION

Figure 1:
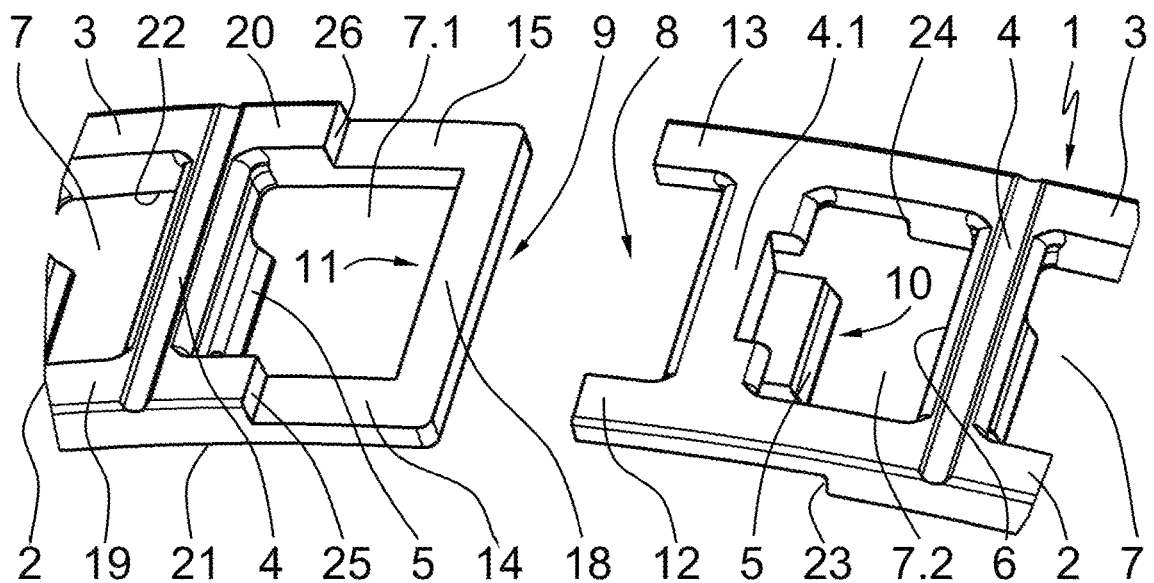
FIG. 1 shows an enlarged spatial representation of two cage ends of a rolling bearing cage according to the disclosure.
Figure 3:
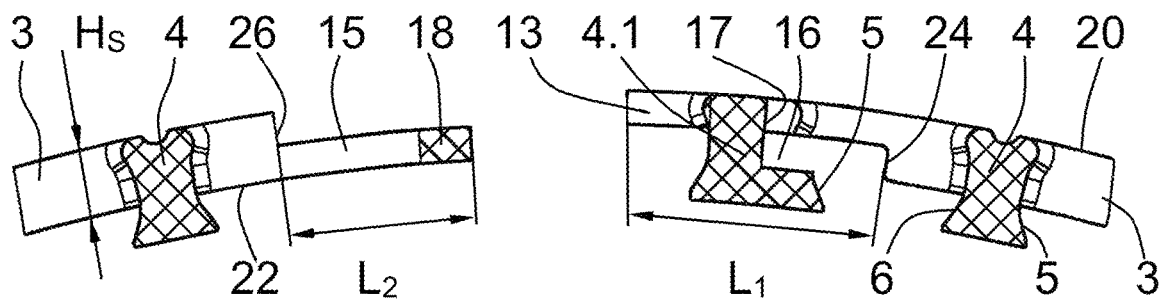
FIG. 3 shows a side view of the two cage ends of the rolling bearing cage according to the disclosure according to section B-B in FIG. 2.
Figure 4:
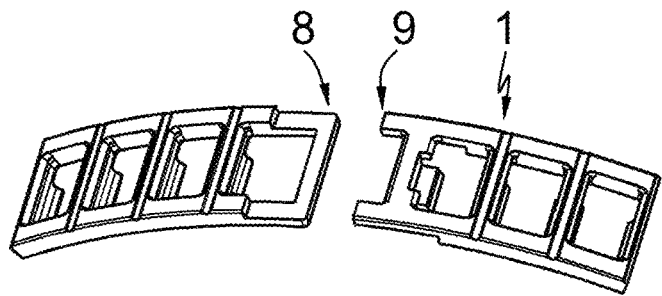
FIG. 4 shows a spatial representation of a first method step for mounting the rolling bearing cage according to the disclosure.

FIG. 1 shows a partial view of a rolling bearing cage 1 suitable for an inner-ring-fastened roller sleeve, which consists of two side rings 2, 3 which have a common axis of rotation and the same basic dimensions and which are axially spaced apart from one another, and a plurality of cage webs 4 which connect the side rings 2, 3 to one another, which, as shown in FIG. 3, are designed with rolling element guides 5, 6 projecting inwards from the cage beyond the inner diameter of the side rings 2, 3, and between each of which cage pockets 7 are formed for receiving rolling elements (not shown). As can clearly be seen, the rolling bearing cage 1 is axially divided at a peripheral location and as a result has a first and a second cage end 8, 9, at each of which mutually corresponding closure elements 10, 11 are located for connecting the cage ends 8, 9. In addition, the side rings 2, 3 are formed in a known manner with end portions 12, 13, 14, 15 which are reduced to half their radial height HS and which are arranged radially one above the other when the rolling bearing cage 1 is closed.

Figure 2:
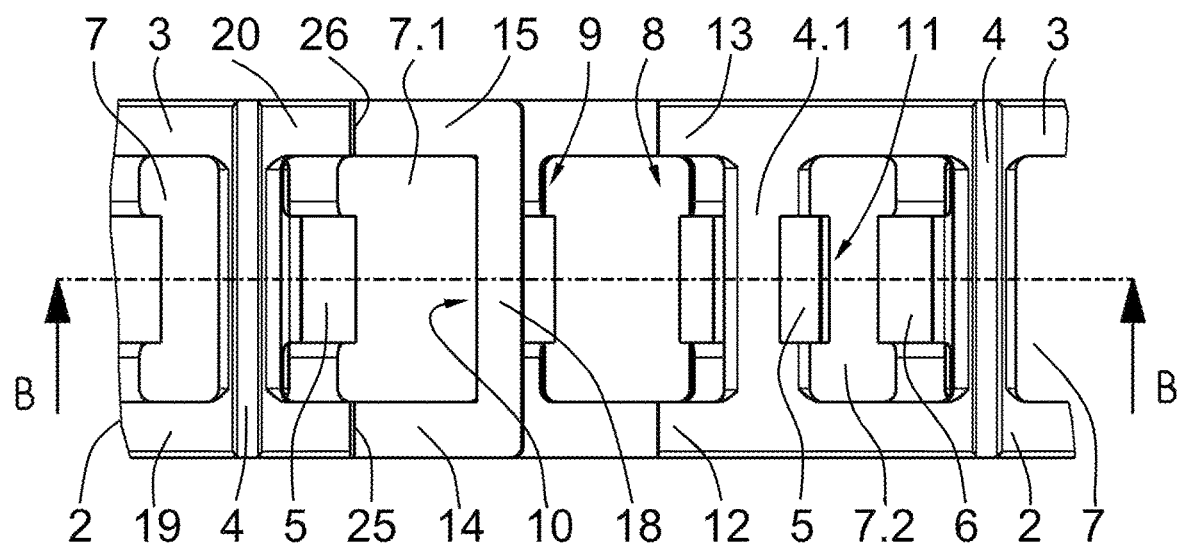
FIG. 2 shows an enlarged top view of the two cage ends of the rolling bearing cage according to the disclosure.

FIGS. 1 and 2 also show that between the height-reduced end portions 12, 13 at the first cage end 8, a cage web 4.1, the two sides of which delimit a last 7.1 and a penultimate cage pocket 7.2, respectively, is arranged, which, as shown in FIG. 3, is formed with a cross-sectional profile which is reinforced in comparison with the other cage webs 4. The closure element 10 at the first cage end 8 is formed accordingly by an axial groove 16, also shown in FIG. 3, in the rolling element guide 5 at the radial web surface 17 of the cage web 4.1 which delimits the penultimate cage pocket 7.2, while the closure element 11 at the second cage end 9 is formed by a partial web 18 which connects the height-reduced end portions 14, 15 at the second cage end 9 to one another and has the same material thickness as the end portions 14, 15 and which can be hooked into the axial groove 16 in the rolling element guide 5 of the cage web 4.1 at the first cage end 8 in such a way that the cage ends 8, 9 are secured in a peripheral direction and in both radial directions against unintentional loosening of the connection. The axial groove 16 has the same profile cross-section as the partial web 18 connecting the end portions 14, 15 to one another at the second cage end 9 and is completely filled by the partial web 18.

Likewise, it can be seen from FIGS. 1 and 3 that the height-reduced end portions 12, 13 at the first cage end 8 are formed on the side rings in extension of the outer peripheral surfaces 19, 20 of the side rings 2, 3, and the height-reduced end portions 14, 15 at the second cage end 9 are formed on the side rings in extension of the inner peripheral surfaces 21, 22 thereof, and that the height reduction of the end portions 12, 13, 14, 15 is effected by straight steps 23, 24 25, 26 in the side rings 2, 3. Furthermore, in order to avoid a collision of the partial web 18 at the second cage end 8 with the steps 23, 24 of the end portions 12, 13 at the first cage end 9 when the cage ends 8, 9 are connected, the end portions 12, 13 at the first cage end 8 have a greater length L1 than the length L2 of the end portions 14, 15 at the second cage end 9.

FIG. 2 also shows that both the rolling element guide 5 of the cage web 4.1 at the first cage end 8 and all other rolling element guides 5 on the cage webs 4 are designed to be axially shorter than the cage web 4.1 itself and are arranged axially centrally on the cage webs 4, 4.1 so that, during mounting of the rolling bearing cage 1, the end portions 12, 13 at the first cage end 8 can be arranged axially adjacent to the end portions 14, 15 at the second cage end 9. The securing of the cage ends 8, 9 against unintentional loosening of the connection in the other peripheral direction is effected by filling a rolling element into the penultimate cage pocket 7.2 of the rolling bearing cage 1 completed after the connection of the cage ends 8, 9 to the partial web 18 and the securing of the cage ends 8, 9 against displacement in both axial directions and the centering of the cage ends 8, 9 relative to one another is effected by filling a rolling element into the last cage pocket 7.1 of the rolling bearing cage 1 completed after the connection of the cage ends 8, 9.

Figure 5:
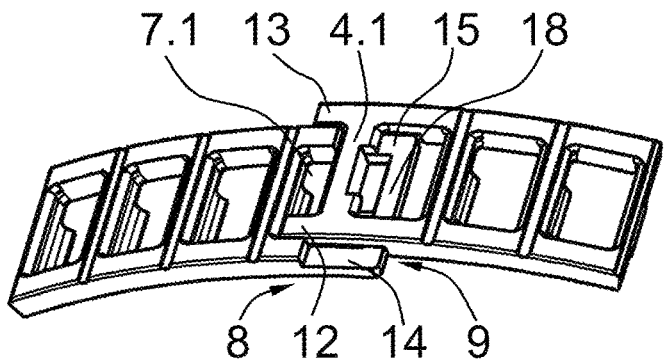
FIG. 5 shows a spatial representation of a second method step for mounting the rolling bearing cage according to the disclosure.
Figure 6:
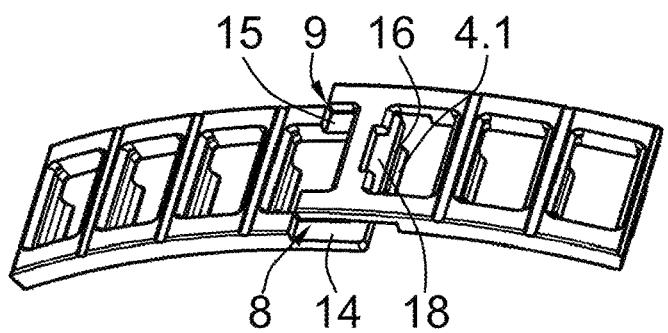
FIG. 6 shows a spatial representation of a third method step for mounting the rolling bearing cage according to the disclosure.
Figure 7:
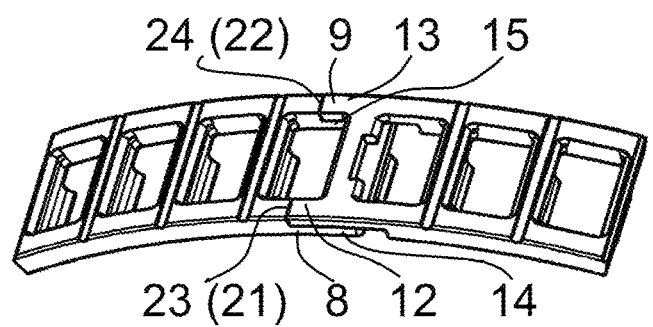
FIG. 7 shows a spatial representation of a fourth method step for mounting the rolling bearing cage according to the disclosure.

FIGS. 4 to 7 schematically show the individual method steps for mounting the rolling bearing cage 1. Accordingly, in the first method step shown in FIG. 4, the cage ends 8, 9 of the axially divided rolling bearing cage 1 are first widened to such an extent that it can be pushed into a roller sleeve via a radial flange of the inner ring of the sleeve (not shown). As shown in FIG. 5, the cage ends 8, 9 are then displaced tangentially relative to one another in such a way that the cage web 4.1 at the first cage end 8 is lifted over the partial web 18 at the second cage end 9 into the last cage pocket 7.1 and the end portions 12, 13 at the first cage end 8 are arranged axially adjacent to the end portions 14, 15 at the second cage end 9. Then, as indicated in FIG. 6, the cage ends 8, 9 are displaced tangentially backwards against one another until the partial web 18 at the second cage end 9 displaces into the axial groove 16 in the rolling element guide 5 of the cage web 4.1 at the first cage end 8 and completely fills the axial groove 16. The cage ends 8, 9 are then displaced axially in the manner shown in FIG. 7 until the end portions 12, 13 at the first cage end 8 are arranged radially above the end portions 14, 15 at the second cage end 9, and finally the connection of the cage ends 8, 9 is secured against unintentional loosening in the peripheral direction by inserting the rolling elements of the roller sleeve into the pockets 7, 7.1, 7.2 of the rolling bearing cage 1.

REFERENCE NUMERALS

1 Rolling bearing cage
2 Side ring of 1
3 Side ring of 1
4 Cage webs of 1
4.1 Cage web
5 Rolling element guide on 4, 4.1
6 Rolling element guide on 4
7 Cage pockets of 1
7.1 Last cage pocket
7.2 Penultimate cage pocket
8 First cage end
9 Second cage end
10 Closure element on 8
11 Closure element on 9
12 End portion of 2
13 End portion of 3
14 End portion of 2
15 End portion of 3
16 Axial groove in 5
17 Radial web surface of 4.1
18 Partial web of 4.1
19 Outer peripheral surface of 2
20 Outer peripheral surface of 3
21 Inner peripheral surface of 2
22 Inner peripheral surface of 3
23 Step on 12
24 Step on 13
25 Step on 14
26 Step on 15
HS Radial height of 2 and 3
L1 Length of 12 and 13
L2 Length of 14 and 15

The invention claimed is:

1. A rolling bearing cage having a cage lock, the cage lock comprising two side rings which have a common axis of rotation and same basic dimensions and which are axially spaced apart from one another, and a plurality of cage webs which connect the side rings to one another and which are designed with rolling element guides projecting inwards from the cage over an inner diameter of the side rings, and between each cage web, cage pockets are formed for receiving rolling elements, wherein the rolling bearing cage is axially divided at at least one peripheral location and as a result has at least a first cage end and a second cage end, at each of the first cage end and the second cage end, mutually corresponding closure elements are arranged, and the side rings are designed with height-reduced end portions which are reduced to half a radial height (HS) of the side rings and which are arranged radially one above the other when the rolling bearing cage is closed, wherein, between the height-reduced end portions at the first cage end, a cage web, delimiting on one side in each case a last and a penultimate cage pocket, is arranged with a cross-sectional profile which is reinforced relative to the other cage webs, and the closure element at the first cage end is formed by an axial groove in the rolling element guide at a radial web surface of the cage web which delimits the penultimate cage pocket, while the closure element at the second cage end is formed by a partial web which connects the height-reduced end portions at the second cage end to one another and has a same material thickness as the end portions and which can be hooked into the axial groove in the rolling element guide of the cage web at the first cage end in such a way that the cage ends are secured in a peripheral direction and in both radial directions against unintentional loosening.

2. The rolling bearing cage according to claim 1, wherein the height-reduced end portions at the first cage end are formed on the side rings in an extension of outer peripheral surfaces of the side rings, and the height-reduced end portions at the second cage end are formed on the side rings in an extension of inner peripheral surfaces of the side rings.

3. The rolling bearing cage according to claim 1, wherein a height reduction of the end portions is effected by straight steps in the side rings and the end portions at the first cage end have a greater length than a length of the end portions at the second cage end.

4. The rolling bearing cage according to claim 1, wherein both the rolling element guide of the cage web at the first cage end and all other rolling element guides on the cage webs are designed to be axially shorter than the cage web itself and are arranged axially centrally on the cage webs.

5. The rolling bearing cage according to claim 1, wherein the axial groove in the rolling element guide of the cage web at the first cage end has the same profile cross-section as the partial web connecting the end portions to one another at the second cage end, and the axial groove is filled by the partial web.

6. The rolling bearing cage according to claim 1, wherein the securing of the cage ends against unintentional loosening of the connection in the other peripheral direction is effected by filling a rolling element into the penultimate cage pocket of the rolling bearing cage completed after the cage ends are connected to the partial web.

7. The rolling bearing cage according to claim 1, wherein the securing of the cage ends against displacement in both axial directions and centering of the cage ends relative to one another is effected by filling a rolling element into the last cage pocket of the rolling bearing cage completed after the cage ends are connected.

8. The rolling bearing cage of claim 1, wherein:
the end portion at the first cage end is formed on an outer peripheral surface of the rolling bearing cage; and
the end portion at the second cage end is formed on an inner peripheral surface of the rolling bearing cage.

9. The rolling bearing cage of claim 1, wherein a length of the first cage end is greater than a length of the second cage end.

10. The rolling bearing cage of claim 1, wherein the rolling element guides are axially shorter than the cage webs and arranged axially centrally on respective cage webs.

11. The rolling bearing cage of claim 1, wherein:
the axial groove has a same profile cross-section as the partial cage web; and
the axial groove is filled by the partial cage web.

12. The rolling bearing cage of claim 1, wherein a rolling element disposed in the penultimate cage pocket further secures the second cage end to the first cage end against unintentional loosening in the peripheral direction after the partial cage web is hooked into the axial groove.

13. The rolling bearing cage of claim 1, wherein a rolling element disposed in the penultimate cage pocket further secures the second cage end to the first cage end against displacement in both axial directions and centers the second cage end relative to the first cage end after the partial cage web is hooked into the axial groove.

14. A method for mounting a rolling bearing cage of claim 1, comprising:
a) widening the cage ends of the axially divided rolling bearing cage to such an extent that it can be pushed into a roller sleeve via a radial flange of an inner ring of said roller sleeve;
b) tangentially displacing the cage ends relative to one another in such a way that the cage web at the first cage end is lifted over the partial web at the second cage end into the last cage pocket and the end portions at the first cage end are arranged axially adjacent to the end portions at the second cage end;
c) tangentially displacing the cage ends backwards against one another until the partial web at the second cage end displaces into the axial groove in the rolling element guide of the cage web at the first cage end and fills the axial groove;
d) axially displacing the cage ends until the end portions at the first cage end are arranged radially above the end portions at the second cage end; and
e) securing the cage ends against unintentional loosening in the peripheral direction by inserting rolling elements of the roller sleeve into the pockets of the rolling bearing cage.

15. A rolling bearing cage comprising:
a first side ring and a second side ring axially spaced apart from one another, the first side ring and the second side ring comprising:
a common axis of rotation;
same basic dimensions;
respective end portions comprising a reduced radial height that is half a radial height of a remainder of the side rings and arranged radially one above the other when the rolling bearing cage is closed;
a plurality of cage webs connecting the first side ring to the second side ring, each of the plurality of cage webs comprising a rolling element guide projecting radially inwards;
a plurality of cage pockets formed between respective pairs of rolling element guides for receiving respective rolling elements;
a first cage end disposed at a first side of an axially divided portion of the rolling bearing cage, comprising a first cage end closing element formed by an axial groove at a radial web surface of a one of the plurality of cage webs that is reinforced relative to the other cage webs and delimits a penultimate cage pocket; and a second cage end disposed at a second side of the axially divided portion, comprising a second cage end closing element formed by a partial cage web connecting the end portions at the second cage end to one another, the partial cage web comprising the reduced radial height and arranged to hook into the axial groove to form a cage lock that secures the second cage end to the first cage end against unintentional loosening in a peripheral direction and in both radial directions.

\* \* \* \* \*